United States Patent
Freiberger et al.

[15] 3,668,497
[45] June 6, 1972

[54] HEATER BLOWER MOTOR DELAY ENERGIZING MEANS

[72] Inventors: Ronald D. Freiberger; James L. Woolley, both of Kokomo, Ind.

[73] Assignee: General Motors Corporation, Detroit, Mich.

[22] Filed: Oct. 6, 1970

[21] Appl. No.: 78,354

[52] U.S. Cl. .............................................. 318/471, 318/472
[51] Int. Cl. ....................................................... G05d 23/30
[58] Field of Search ........................... 318/471, 473, 609, 610

[56] References Cited

UNITED STATES PATENTS

| | | | |
|---|---|---|---|
| 2,830,245 | 4/1958 | Davis et al. ............................. 318/610 |
| 2,482,565 | 9/1949 | Tramontini ......................... 318/471 X |
| 2,553,060 | 5/1951 | Miner ................................... 318/471 X |

OTHER PUBLICATIONS

RCA Technical Notes, " Blower Control Circuit," Walter C. Painter, RCA TN No: 646, Nov. 1965, Sheets 1 & 2

Primary Examiner—T. E. Lynch
Attorney—Jean L. Carpenter and Paul Fitzpatrick

[57] ABSTRACT

Apparatus for controlling the operation of a blower motor in a vehicle heating system. A time delay network which includes a heater and a temperature responsive switch in an insulated enclosure and a power relay provides for the immediate energization of the blower motor when a motor controlling switch is placed in a motor operative condition and the ambient temperature as sensed by the temperature responsive switch is above a certain level. Delayed operation of the blower motor is provided when the ambient temperature is below the certain level, the delay continuing until the interior temperature of the enclosure is raised above the certain temperature by the heater when the motor controlling switch is placed in the motor operative setting. An override switch is provided for effecting immediate operation of the blower motor when the ambient temperature is below the certain level if desired by the vehicle occupant so as to provide for immediate defrosting of the vehicle windows.

6 Claims, 1 Drawing Figure

PATENTED JUN 6 1972          3,668,497
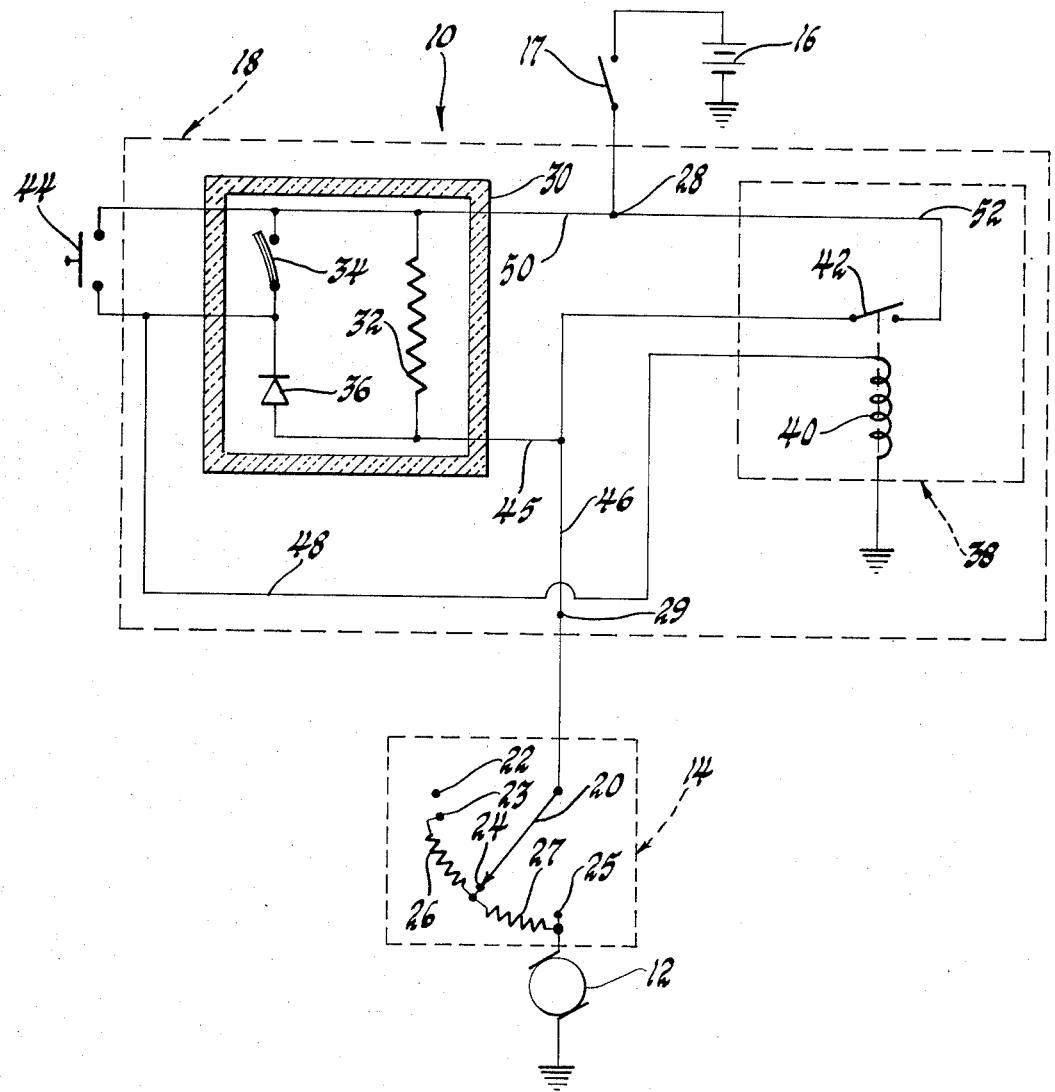
INVENTORS
Ronald D. Freiberger
BY & James L. Woolley
Paul Fitzpatrick
ATTORNEY

HEATER BLOWER MOTOR DELAY ENERGIZING MEANS

This invention relates to vehicle temperature control systems and, more particularly, to a control circuit for controlling the operation of a blower motor in a vehicle heating system.

Many diverse types of heater systems for motor vehicles are in widespread use at the present time. These systems generally provide for selective operation of a blower motor when a vehicle occupant places a motor controlling switch in a motor operative setting. The blower motor serves to blow air past a heating coil and into the vehicle passenger compartment so as to maintain a comfortable temperature in the passenger compartment, a portion of the air flow sometimes being directed against the vehicle windows for defrosting purposes. However, these prior heating systems generally provide for immediate operation of the blower motor upon placement of the motor control switch in a motor operative setting regardless of the temperature of the heating coil, which is typically heated by hot water from the vehicle's engine cooling system.

Accordingly, when the water in the engine cooling system is relatively cold, due to the engine not having been operated for a substantial period of time the operation of the blower motor serves only to blow cool air into the vehicle passenger compartment, which may decrease comfort of the vehicle occupants.

While a fixed time delay may be provided to preclude operation of the blower motor for a predetermined time after the motor controlling switch is placed in a motor control setting such a provision is unsatisfactory for many obvious reasons. For example, operation of the blower motor is often immediately necessary upon starting a vehicle to facilitate defrosting the vehicle windows. In addition, when the blower motor is also employed in an air conditioning system its immediate operation is desired for blowing cool air into the passenger compartment regardless of the water temperature in the engine cooling system. It has, therefore, been recognized that immediate operation of the blower motor is desirable when the ambient temperature is above a certain temperature to facilitate operation of the air conditioning system. Similarly, when the ambient temperature is only slightly below the certain temperature or the water in the engine cooling system is still hot from previous engine operation it is desirable that the blower motor be employed to facilitate heating the passenger compartment after a shorter time delay than would be required if the ambient temperature were colder or the engine had not been recently operated. Accordingly, the blower motor operation should be made dependent upon both the ambient temperature, as sensed in the vehicle passenger compartment, and the temperature of the engine.

It is, therefore, an object of this invention to provide motor control apparatus which delays the operation of a blower motor in a vehicle heating system for a predetermined time in accordance with the ambient temperature so as to preclude operation of the blower motor until sufficient time has elapsed after a motor controlling switch is placed in a motor operative setting to assure that the vehicle occupants are warmed by operation of the blower motor.

It is another object of this invention to provide blower motor control apparatus which normally delays operation of a vehicle blower in accordance with the ambient temperature and which provides for immediate operation of the blower motor regardless of the ambient temperature if desired by a vehicle occupant.

It is yet another object of this invention to provide blower motor control apparatus which incorporates a variable time delay in the blower motor operation in accordance with the ambient temperature and recent operation of the vehicle engine.

The foregoing and other objects and advantages of the subject invention will become apparent from the following description and accompanying drawing, which schematically illustrates blower motor control apparatus according to the principles of the subject invention.

As is shown in the drawing, a motor control circuit 10 which embodies the principles of the subject invention includes a blower motor 12 for use in a vehicle heating system (not shown), a motor controlling switch 14 for controlling the energization of the blower motor 12 by a suitable power source, such as a vehicle battery 16, a vehicle ignition switch 17 for precluding operation of the blower motor 12 except when the vehicle ignition is turned on, and a time delay network 18 for controlling the energization of the motor 12 by the battery 16 in accordance with the ambient temperature and previous operation of the motor, as will subsequently be explained.

Since the blower motor 12 and the motor control switch 14 may be of many designs presently in widespread use they are illustrated for descriptive purposes as merely comprising a DC motor and a conventional multiposition switch having a motor inoperative setting, in which a switch arm 20 engages a first contact 22, and a plurality of motor operative settings, in which the switch arm 20 engages one of the contacts 23 through 25 that are connected by resistors 26 and 27. The motor controlling switch 14 is connected in series with the blower motor 12 and the battery 16 so that the blower motor 12 may only be energized by the battery 16 when the ignition switch 17 is closed, the motor controlling switch 14 is in one of the motor operative settings, and the time delay network 18 completes a low impedance current path between the terminals 28 and 29 of the time delay network 18.

The time delay network 18 includes an insulated enclosure 30 which contains a heater element 32, a temperature responsive switch 34, and a diode 36, the purpose of which will later become apparent. The time delay network 18 also includes a power switch 38 which consists of a relay coil 40 and a set of relay contacts 42 for completing a low impedance current path between the terminals 28 and 29 when the temperature responsive switch 34 is closed. Since the temperature responsive switch 34 is responsive to the interior temperature of the enclosure 30 it is responsive to both the ambient temperature in the vehicle passenger compartment and prior operation of the blower motor 12, as will subsequently be explained in detail.

In addition, the motor control circuit 10 also includes a selectively operable manual switch 44 for actuation by a vehicle occupant who wishes to obtain immediate operation of the blower motor 12 regardless of the ambient temperature. To prevent discomfort of the vehicle occupants when the blower motor 12 is operated by closure of the switch 44 the vehicle occupants may direct the flow of cool air against the windows of the vehicle by suitable air flow directing apparatus (not shown) so as to obtain immediate defrosting of the vehicle windows regardless of the ambient temperature.

The operation of the motor control circuit 10 will now be explained. The enclosure 30, which by way of example, may be made of a polyurethane foam, is located in the passenger compartment of a vehicle. The interior temperature of the enclosure 30 thus becomes the same as the ambient temperature in the passenger compartment if the vehicle remains inoperative for a long period. Accordingly, by making the temperature responsive switch 34 of a bimetallic type which is open at temperatures below a certain temperature and closed at temperatures above the certain temperature the switch 34 operates in accordance with the ambient temperature. That is, if the ambient temperature is below the certain level the switch 34 is open. Should the vehicle be started and the motor controlling switch 14 be placed in the illustrated motor operative setting when the ambient temperature is below the certain temperature, a current passes from the battery 16 through the ignition switch 17 and the heater 32. Since the heater 32 is a relatively high resistance device the current is relatively small.

From the heater 32 a portion of this current passes through a pair of leads 45 and 46, the switch arm 20, the resistor 27, and the blower motor 12. The remainder of the current passes through the diode 36, a lead 48, and the relay coil 40. While the current through the heater 32 is insufficient to energize either the blower motor 12 or the relay coil 40, due to the relatively large resistance of the heater 32, the current through the heater 32 causes internal heating of the heater 32 so as to raise the interior temperature of the enclosure 30.

When the interior temperature of the enclosure 30 is above the certain temperature the switch 34 is closed so as to apply substantially the entire voltage of the battery 16 to the relay coil 40 through a lead 50, the switch 34, and the lead 48. Since the voltage of the battery 16 exceeds the pickup voltage of the relay coil 40 the relay coil 40 is thus energized when the switch 34 is closed.

Upon energization of the relay coil 40 the contacts 42 are closed so as to bypass the heater 32 and complete a low impedance current path from the battery 16 through a lead 52, the lead 46, the motor control switch 14, and the blower motor 12. Since the only substantial resistance in the current path is presented by the resistor 27 in the motor controlling switch 14 the battery 16 energizes the blower motor 12, causing it to operate. By properly designing the enclosure 30 so that its interior temperature exceeds the certain temperature at substantially the same time as when the water in the vehicle engine cooling system reaches a predetermined temperature the blower motor 12 is caused to operate only when the air which it blows will warm the vehicle passengers. Since both the initial temperature of the vehicle engine and the ambient temperature in the vehicle passenger compartment are affected by the same temperature conditions outside the vehicle the interior temperature of the enclosure 30, which is increased by the heater 32 only when the ignition switch is closed, is a rough analog of the vehicle engine temperature.

Since the closed contacts 42 short the heater 32 the interior temperature of the enclosure 30 begins to decrease upon energization of the relay coil 40. As the interior temperature of the enclosure 30 falls below the certain temperature the switch 32 is opened. However, upon opening of the switch 34 energization of the relay coil 40 is maintained through the contacts 42, the leads 46 and 45, the diode 36, and the lead 48. The relay coil 38 is thus latched in its energized condition by the contacts 42 until the vehicle is stopped and the ignition switch 17 is opened. It is therefore possible to intermittently operate the blower motor 12 while the vehicle is in operation as once the blower motor 12 has been operated it will thereafter begin operation immediately upon placing the motor controlling switch 14 in a motor operative setting. Since the engine coolant remains hot so long as the engine is being operated the blower motor 12 serves to warm the vehicle passenger whenever it is operated.

Under certain conditions it may be desirable to operate the blower motor 12 immediately even though the interior temperature of the enclosure 30 is below the certain temperature as, for example, when the vehicle has been setting in a cold environment and the vehicle windows need to be defrosted immediately. When such operation is desired a vehicle occupant may begin immediate operation of the blower motor 12 by closing the selectively operable switch 44, which is portrayed merely for illustrative purposes as being a push-button switch. When the push-button switch 44 is closed the relay coil 40 is connected to the battery through the leads 48 and 50. The relay coil 40 is therefore immediately energized when the push-button switch 44 is closed so as to energize the blower motor 12 through the contacts 42 in the fashion previously explained.

The blower motor 12 may also be used in conjunction with air conditioning systems presently in widespread vehicle usage. When used in an air conditioning system (not shown) the blower motor 12 is operated both to heat and cool the vehicle passenger compartment, depending upon its temperature. Accordingly, the enclosure 30 may be designed so that the certain temperature is at a point below which the heater will be used and above which the air conditioner will be used. For customary comfort levels the certain temperature is therefore established between 75 and 80 degrees Fahrenheit. Accordingly, when the air conditioner is to be operated the interior temperature of the enclosure 30 is always above the certain level, due to the high ambient temperature in the passenger compartment. The blower motor 12 is therefore immediately operated whenever the motor controlling switch 14 is placed in a motor operative setting for cooling the passenger compartment. Of course, operation of the blower motor 12 to heat the passenger compartment is effected in conjunction with the heater as previously explained.

It is thus apparent that we have developed a new and useful system for controlling the operation of a blower motor under a wide range of operating conditions, though persons versed in the art will appreciate that various modifications of our design may be made without departing from the spirit of this invention.

We claim as our invention:

1. Apparatus for controlling the operation of a motor comprising, in combination, means for connecting the motor to a power source effective to energize the motor, motor controlling switch means having at least one operative condition, and control means series connected with the motor, the connecting means, and the motor controlling switch means for controlling the energization of the motor, the motor being deenergized until energized by the control means, the control means including an insulated enclosure, heating means responsive to the setting of the motor controlling switch means for increasing the interior temperature of the enclosure upon placement of the motor controlling switch means in the operative setting, temperature sensing means responsive to the interior temperature of the enclosure, and power switch means responsive to the temperature sensing means for completing a low impedance current path through the connecting means and the motor to energize the motor when the interior temperature of the enclosure as sensed by the temperature sensing means is above a certain level and for preventing the heating means from substantially increasing the interior temperature of the enclosure above the certain level, the control means being ineffective for energizing the motor when the temperature is below the certain level, the control means thereby effecting immediate energization of the motor when the motor controlling switch means is placed in the operative setting and the interior temperature of the enclosure is above the certain level and preventing energization of the motor by the power source until the interior temperature of the enclosure has been increased above the certain level when the motor controlling switch means is placed in the operative setting and the interior temperature of the enclosure is below the certain level.

2. Apparatus for controlling the operation of a motor comprising, in combination, means for connecting the motor to a power source effective to energize the motor, a motor controlling switch having at least one operative setting for enabling the power source to energize the motor, means for controlling the energization of the motor in accordance with the setting of the motor controlling switch, the motor being deenergized until energized by the last mentioned means, said means including an insulated enclosure, a heater that is responsive to the motor controlling switch for heating the interior of the enclosure when the motor controlling switch is in the operative setting, a temperature responsive device that is responsive to the interior temperature of the enclosure, the temperature responsive device assuming a first operative condition when the enclosure interior temperature is above a certain level and a second operative condition when the enclosure interior temperature is below the certain level, and switch means for effecting energization of the motor by the power source when the motor controlling switch is in the operative setting and the enclosure interior temperature as sensed by the temperature sensing means is above the certain level, the means for controlling the energization of the motor being ineffective for energizing the motor when the temperature is below the certain level, and manually actuable means for selectively causing the switch means to effect energization of the motor when the motor controlling switch is in the operative setting regardless of the enclosure interior temperature.

3. Motor control apparatus comprising, in combination, a power source, a motor, a motor controlling switch for connecting the power source and the motor in series circuit, the switch having at least one operative setting in which the switch closes the circuit so as to permit energization of the motor by the power source, and means for delaying the energization of the motor by the power source in accordance with the ambient temperature when the switch is placed in the operative setting, said means including a heater element connected in said series circuit, a thermal switch responsive both to ambient temperatures and to heat generated by the heater element so as to assume a first operative condition when below a certain temperature and a second operative condition when above the certain temperature, and power switch means connected in parallel with the heater element and responsive to the thermal switch so as to preclude energization of the motor when the thermal switch is in the first operative condition and to effect energization of the motor when the thermal switch is in the second operative condition.

4. Apparatus for controlling a motor in accordance with ambient temperatures comprising, in combination, a power source for energizing the motor, a selectively operable motor controlling switch having at least one motor operative setting in which the switch permits energization of the motor, and time delay means for delaying the energization of the motor by the power source upon placement of the motor controlling switch in the motor operative setting in accordance with the ambient temperature, the time delay means including an insulated enclosure the interior temperature of which is normally at the ambient temperature, heater means responsive to the motor controlling switch setting for increasing the interior temperature of the enclosure upon placement of the motor controlling switch in the motor operative setting, temperature responsive switch means responsive to the interior temperature of the enclosure and having a first operative setting when the enclosure interior temperature is below a certain level and a second operative setting when the enclosure interior temperature is above the certain level, and power switch means responsive to the temperature responsive switch both for precluding further heating of the enclosure interior temperature by the heater means and for connecting the power source to the motor effective to energize the motor when the temperature responsive switch is in the second operative setting, whereby the motor is immediately energized by the power source upon placement of the motor controlling switch in the motor operative setting when the ambient temperature as detected by the temperature responsive switch is above the certain level and, when the motor controlling switch is placed in the motor operative setting while the ambient temperature is below the certain level, is energized by the power source after the interior temperature of the enclosure is heated above the certain level by the heater means.

5. A vehicle compartment heater blower motor control circuit comprising, a series circuit including the blower motor, a blower motor control switch having an open circuit position and at least one closed circuit position, a power supply and a switch means, said switch means having a normally nonconducting state and a conducting state when energized, the blower motor being deenergized when the switch means is nonconducting; an enclosure contained within the vehicle compartment; a heater contained within the enclosure, the heater being responsive to the position of the blower motor control switch for heating the enclosure when the blower motor control switch is positioned in the closed circuit; temperature sensing means contained within the enclosure for energizing the switch means when the temperature within the enclosure is at or above a predetermined value; and latching means responsive to the switch means for latching the switch means in the conducting state, whereby the blower motor is continually energized when the temperature within the enclosure reaches the predetermined value.

6. A vehicle compartment heater blower motor control circuit comprising, a series circuit including the blower motor, a blower motor control switch having an open circuit position and at least one closed circuit position, a power supply and a switch means, said switch means having a normally nonconducting state and a conducting state when energized, the blower motor being deenergized when the switch means is nonconducting; and enclosure contained within the vehicle compartment; a heater contained within the enclosure, the heater being responsive to the position of the blower motor control switch for heating the interior of the enclosure when the blower motor control switch is positioned in the closed circuit position; temperature sensing means contained within the enclosure for energizing the switch means when the temperature within the enclosure is at or above a predetermined value; latching means responsive to the switch means for latching the switch means in the conducting state; means responsive to the switching means for rendering the heater ineffective to heat the enclosure; and a manually operable switch for selectively energizing the switch means independent of the temperature sensing means, whereby the blower motor is continually energized when the blower motor control is positioned in the closed circuit position and the temperature of the interior of the enclosure reaches the predetermined value even through the temperature of the interior subsequently decreases below the predetermined value.

* * * * *